United States Patent
Naniwa et al.

(10) Patent No.: US 10,797,741 B2
(45) Date of Patent: Oct. 6, 2020

(54) RADIO FREQUENCY MODULE AND COMMUNICATION DEVICE

(71) Applicant: Murata Manufacturing Co., Ltd., Nagaokakyo-shi, Kyoto-fu (JP)

(72) Inventors: Yusuke Naniwa, Nagaokakyo (JP); Hideki Muto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/435,645

(22) Filed: Jun. 10, 2019

(65) Prior Publication Data
US 2019/0296783 A1 Sep. 26, 2019

Related U.S. Application Data

(63) Continuation of application No. PCT/JP2017/046436, filed on Dec. 25, 2017.

(30) Foreign Application Priority Data

Dec. 27, 2016 (JP) .................. 2016-254510

(51) Int. Cl.
*H04L 5/12* (2006.01)
*H04B 1/12* (2006.01)
(Continued)

(52) U.S. Cl.
CPC .............. *H04B 1/12* (2013.01); *H01P 1/203* (2013.01); *H01P 5/02* (2013.01); *H01P 7/08* (2013.01);
(Continued)

(58) Field of Classification Search
CPC ......... H04B 1/12; H04B 1/163; H04B 1/1027
See application file for complete search history.

(56) References Cited

U.S. PATENT DOCUMENTS

2007/0103257 A1* 5/2007 Murata ................... H05K 1/16
 333/185
2013/0200958 A1* 8/2013 Satake ................ H03H 7/0123
 333/5
(Continued)

FOREIGN PATENT DOCUMENTS

JP 2007-128939 A 5/2007
JP 2016-076917 A 5/2016

OTHER PUBLICATIONS

Official Communication issued in International Patent Application No. PCT/JP2017/046436, dated Mar. 20, 2018.

*Primary Examiner* — Dhaval V Patel
(74) *Attorney, Agent, or Firm* — Keating & Bennett, LLP

(57) ABSTRACT

A radio frequency module includes a first receive circuit that processes a receive signal in the first frequency band. The first receive circuit includes a first substrate, a first low noise amplifier, and a first filter circuit. The first low noise amplifier is mounted on a principal surface of the first substrate. The first filter circuit is connected to an output end of the first low noise amplifier. At least a portion of the first filter circuit is provided on the principal surface of the first substrate. The first filter circuit attenuates spurious components occurring due to a transmit signal in the first frequency band received by the first low noise amplifier. The spurious components are included in the transmit signal in the first frequency band and have a frequency bandwidth that overlaps, includes, or is included in the frequency bandwidth of the receive signal in the second frequency band.

20 Claims, 6 Drawing Sheets

(51) Int. Cl.
*H04B 1/10* (2006.01)
*H04B 1/16* (2006.01)
*H04B 1/525* (2015.01)
*H04B 1/00* (2006.01)
*H01P 1/203* (2006.01)
*H01P 5/02* (2006.01)
*H01P 7/08* (2006.01)

(52) U.S. Cl.
CPC ................ *H04B 1/00* (2013.01); *H04B 1/10* (2013.01); *H04B 1/1027* (2013.01); *H04B 1/163* (2013.01); *H04B 1/525* (2013.01)

(56) References Cited

U.S. PATENT DOCUMENTS

| | | | |
|---|---|---|---|
| 2015/0214985 A1* | 7/2015 | Lee | H04B 1/0053 455/77 |
| 2016/0099734 A1 | 4/2016 | Wallis | |
| 2016/0336915 A1* | 11/2016 | Kavousian | H03H 7/0123 |

* cited by examiner

RADIO FREQUENCY MODULE AND COMMUNICATION DEVICE

CROSS REFERENCE TO RELATED APPLICATIONS

This application claims the benefit of priority to Japanese Patent Application No. 2016-254510 filed on Dec. 27, 2016 and is a Continuation Application of PCT Application No. PCT/JP2017/046436 filed on Dec. 25, 2017. The entire contents of each application are hereby incorporated herein by reference.

BACKGROUND OF THE INVENTION

1. Field of the Invention

The present invention relates to a radio frequency module and a communication device, and particularly, to a radio frequency module for simultaneous transmission and reception of signals on two or more waves, and to a communication device including the radio frequency module.

2. Description of the Related Art

Recently, a technique for high-speed and high-capacity wireless communication through simultaneous use of multiple radio waves in different frequency bands, such as carrier aggregation (hereinafter also referred to as CA) has been introduced. For example, there is a known system which has a tunable RF (radio frequency) front-end structure and which is capable of performing the CA operation (U.S. Patent Application Publication No. 2015/0214985).

FIG. 8 is a block diagram illustrating the configuration of a system disclosed in U.S. Patent Application Publication No. 2015/0214985. A system 900 illustrated in FIG. 8 includes tunable RF modules 950 and 960 in a secondary receiver system 920. The tunable RF module 950 amplifies a receive signal in a frequency band in the MB/HB (middle band/high band) group of 1.7 GHz to 2.7 GHz by using a low noise amplifier (hereinafter may be also referred to as an "LNA") 954. The tunable RF module 960 amplifies a receive signal in a frequency band in the LB (low band) group of 0.7 GHz to 1.0 GHz, by using an LNA 964.

The system 900 is capable of performing the CA operation, for example, by using a frequency band in to the MB/HB band group and a frequency band in to the LB band group. U.S. Patent Application Publication No. 2015/0214985 indicates that CA, in which multiple signals in different frequency bands are received, has a problem in attenuating out-of-band signals in a desired receive signal. In U.S. Patent Application Publication No. 2015/0214985, a transmit signal, which leaks from an antenna, is described as an exemplary out-of-band signal.

In simultaneous transmission and reception of signals on two or more waves, when the frequencies of spurious components which occur in a first receive circuit (for example, spurious components which occur from a transmit signal leaking from a transmit circuit into a receive circuit) overlap, include, or are included in the receive frequencies for a second receive circuit, the spurious components may leak through wiring and terminals and may degrade the receiver sensitivity of the second receive circuit. In addition, RF components have been highly integrated, and the distance between modules or between wires has become shorter. This causes a problem of leaking signals.

However, U.S. Patent Application Publication No. 2015/0214985 does not describe a problem of degrading the receiver sensitivity of the second receive circuit due to leaking spurious components. For example, in FIG. 4 in U.S. Patent Application Publication No. 2015/0214985, a filter is disposed downstream of an LNA. Before attenuation using the filter, spurious components may leak through wires and terminals, resulting in degradation in the receiver sensitivity of the second receive circuit.

SUMMARY OF THE INVENTION

Preferred embodiments of the present invention provide radio frequency modules each of which effectively reduces or prevents degradation in receiver sensitivity due to spurious components which occur from an LNA and which leak from a first receive circuit into a second receive circuit, in simultaneous transmission and reception using two or more waves.

A radio frequency module according to a preferred embodiment of the present invention is used to receive/transmit a plurality of signals simultaneously. The plurality of signals include at least a receive signal in a first frequency band and a receive signal in a second frequency band. The radio frequency module includes a first receive circuit that processes the receive signal in the first frequency band. The first receive circuit includes a first substrate, a first low noise amplifier that is mounted on a principal surface of the first substrate, and a first filter circuit that is connected to an output end of the first low noise amplifier and that includes at least a first portion provided on the principal surface of the first substrate. The first filter circuit attenuates spurious components. The spurious components are generated by a transmit signal in the first frequency band received by the first low noise amplifier. The spurious components are included in the transmit signal in the first frequency band and have a frequency bandwidth which overlaps, includes, or is included in a frequency bandwidth of the receive signal in the second frequency band.

In the configuration described above, the output end of the first LNA is connected to the first filter circuit having attenuation characteristics for spurious components of a transmit signal in the first frequency band, and the first LNA and the first filter circuit are provided in the same package. Thus, the first filter circuit attenuates spurious components of a transmit signal in the first frequency band which are output from the first LNA. The configuration in which the first LNA and the first filter circuit are provided in the same package indicates, for example, that the first LNA and the first filter circuit are mounted on the same surface of a substrate.

The configuration in which the first LNA and the first filter circuit are provided in the same package causes the wiring length to connect between the first LNA and the first filter circuit to be reduced, and achieves a reduction in the insertion loss of the first filter circuit.

Thus, in simultaneous transmission and reception of signals on two or more waves, even when spurious components of a transmit signal in the first frequency band and a receive signal in the second frequency band are included in the same frequency range, spurious components, which leak from the first receive circuit into the second receive circuit processing a receive signal in the second frequency band, are able to be attenuated. As a result, degradation in the receiver sensitivity in the second frequency band is able to be reduced or prevented.

The configuration described above causes the first filter circuit to attenuate spurious components occurring from the LNA for the first frequency band. Therefore, a need, for addressing spurious components, to isolate the first receive circuit from the second receive circuit is reduced. As a result, there are a wider range of options, such as the arrangement of components and a wiring pattern. The isolation between the first receive circuit and the second receive circuit indicates isolation between wires downstream of an LNA module or between RFIC terminals.

The first filter circuit may include a variable capacitor, and may have a variable attenuating frequency.

According to this configuration, for example, when the first receive circuit receives a receive signal in a target frequency band selected from multiple frequency bands, the attenuating frequency of the first filter circuit is able to be easily adjusted to the frequency of target spurious components.

The first filter circuit described above uses the variable capacitor to adjust the attenuating frequency. Therefore, for example, compared with a filter circuit which has a wide attenuation band and which may attenuate spurious components in multiple frequency bands at one time, insertion loss is able to be made small. In addition, compared with a circuit in which multiple filter devices (for example, SAW filters), whose attenuating frequencies are fixed to spurious components in the respective frequency bands, are switched in use, the circuit size is able to be reduced.

The variable capacitor may be controlled using an IC (integrated circuit) included in a switch. The variable capacitor included in the IC enables the control wiring to be simplified, thus achieving a reduction in size. In addition, the use of the variable capacitor enables the attenuation pole to be variable. Therefore, when multiple signals in different frequency bands are output from the same output terminal alternately, it is not necessary to provide filters, corresponding to the frequency bands, at the output terminal. Therefore, a reduction in size, cost, and loss due to a reduction in the number of devices is achieved. Further, the IC is able to adjust the pole of a filter, resulting in a small design margin.

A second portion, other than the first portion, of the first filter circuit may be provided inside the first substrate.

For example, in the case in which a device (for example, an inductor) defining a portion of the first filter circuit is a surface mounted component, and in which a device (for example, a matching inductor device) disposed upstream of the first LNA is a surface mounted component, the device included in the first filter circuit and the device disposed upstream of the first LNA may produce electromagnetic field coupling, resulting in degradation in isolation.

If isolation between the first filter circuit and the device disposed upstream of the first LNA is insufficient, attenuation characteristics may be degraded, or oscillation may be produced between the device (for example, an inductor) defining a portion of the first filter circuit and the device (for example, an inductor) disposed upstream of the first LNA.

In contrast, the configuration described above is able to reduce or prevent the occurrence of electromagnetic field coupling by providing at least a portion of the first filter circuit in the substrate. As a result, isolation between a device (for example, an inductor) disposed upstream of the first LNA and the first filter circuit is able to be ensured. Thus, the occurrence of failures, such as degradation in attenuation characteristics and oscillation, which are caused by insufficient isolation is able to be reduced or prevented.

A portion of the first filter circuit provided in the first substrate may be, for example, an embedded inductor defined by a wiring pattern.

The first filter circuit may be connected between the output end of the first low noise amplifier and a ground potential, and may include a short stub including a transmission line. The transmission line exhibits short circuit characteristics for even-order spurious components of the transmit signal in the first frequency band. The expression indicating connection with the ground potential means connection with a power supply node supplying the ground potential. Also in the description below, a similar expression is used.

This configuration causes formation of a short stub, including a transmission line, for spurious components which are output from the first LNA. Therefore, the first filter circuit, which has its attenuation pole at the frequency of a spurious component and whose insertion loss is small, is able to be provided with a small number of components.

The radio frequency module may include a second receive circuit that processes the receive signal in the second frequency band. The second receive circuit may include a second low noise amplifier, and a second filter circuit that is connected to an output end of the second low noise amplifier, and that has attenuation characteristics for spurious components of a transmit signal in the second frequency band.

This configuration enables an advantageous effect the same as or similar to the above-described advantageous effect of the first receive circuit to be obtained in the second receive circuit. That is, in simultaneous transmission and reception of signals on two or more waves, even when spurious components of a transmit signal in the second frequency band and a receive signal in the first frequency band are included in the same frequency range, spurious components leaking from the second receive circuit into the first receive circuit are able to be attenuated. As a result, degradation in the receiver sensitivity in the first frequency band is able to be reduced or prevented.

The radio frequency module may include a first transmission line including a first end connected to the output end of the first low noise amplifier, a second transmission line including a first end connected to the output end of the second low noise amplifier, a variable capacitor including a first end connected to a ground potential, and a switch that connects a second end of the variable capacitor selectively to the output end of the first low noise amplifier or the output end of the second low noise amplifier. A second end of the first transmission line may be connected to a second end of the second transmission line. The first transmission line, the second transmission line, and the variable capacitor may define (i) the first filter circuit exhibiting short circuit characteristics for even-order spurious components of the transmit signal in the first frequency band by electrically connecting the ground potential, the variable capacitor, and the second transmission line to each other in a first state in which the second end of the variable capacitor is connected to the output end of the second low noise amplifier, and (ii) the second filter circuit exhibiting short circuit characteristics for even-order spurious components of the transmit signal in the second frequency band by electrically connecting the ground potential, the variable capacitor, and the first transmission line to each other in a second state in which the second end of the variable capacitor is connected to the output end of the first low noise amplifier.

According to the configuration described above, in the first state, the second transmission line and the variable capacitor define a short stub for spurious components of a transmit signal in the first frequency band. Thus, the first filter circuit having attenuation characteristics for the spurious components is provided. Therefore, first spurious components which are output from the first LNA are attenuated by the first filter circuit, and the first spurious components at the connection point between the second end of the first transmission line and the second end of the second transmission line are attenuated.

In the second state, the first transmission line and the variable capacitor define a short stub for spurious components of a transmit signal in the second frequency band. Thus, the second filter circuit having attenuation characteristics for the spurious components is provided. Therefore, second spurious components which are output from the second LNA are attenuated by the second filter circuit, and the second spurious components at the connection point between the second end of the first transmission line and the second end of the second transmission line are attenuated.

Thus, the filter circuit, which is able to attenuate the first spurious components or the second spurious components selectively in accordance with the state of the switch, is provided by the minimum number of components including the first transmission line, the second transmission line, and the shared variable capacitor.

Using the variable capacitor enables a filter circuit to be provided which is capable of switching between attenuating frequencies and finely adjusting attenuating frequencies and whose circuit size is small.

A communication device according to a preferred embodiment of the present invention includes the radio frequency module and an RF signal processing circuit that receives a radio-frequency receive signal from the radio frequency module.

This configuration includes a radio frequency module which is able to effectively reduce or prevent spurious components causing degradation in receiver sensitivity in simultaneous transmission and reception of signals on two or more waves. Thus, a communication device having excellent receiver sensitivity in simultaneous transmission and reception of signals on two or more waves is provided.

With the radio frequency modules and the communication devices according to preferred embodiments of the present invention, radio frequency modules, which are able to effectively reduce or prevent degradation in receiver sensitivity in simultaneous transmission and reception of signals on two or more waves, and communication devices which have excellent receiver sensitivity in simultaneous transmission and reception of signals on two or more waves are obtained.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings. Each of the preferred embodiments described below indicates a comprehensive or specific example. For example, values, shapes, materials, components, and arrangement and connection structures of components described in the preferred embodiments below are exemplary, and are not intended to limit the scope of the present invention.

First Preferred Embodiment

A radio frequency module (hereinafter may be also referred to as an "RF module") according to a first preferred embodiment of the present invention is a front-end circuit which performs simultaneous transmission and reception of signals on two or more waves in a first frequency band and a second frequency band.

Figure 1:
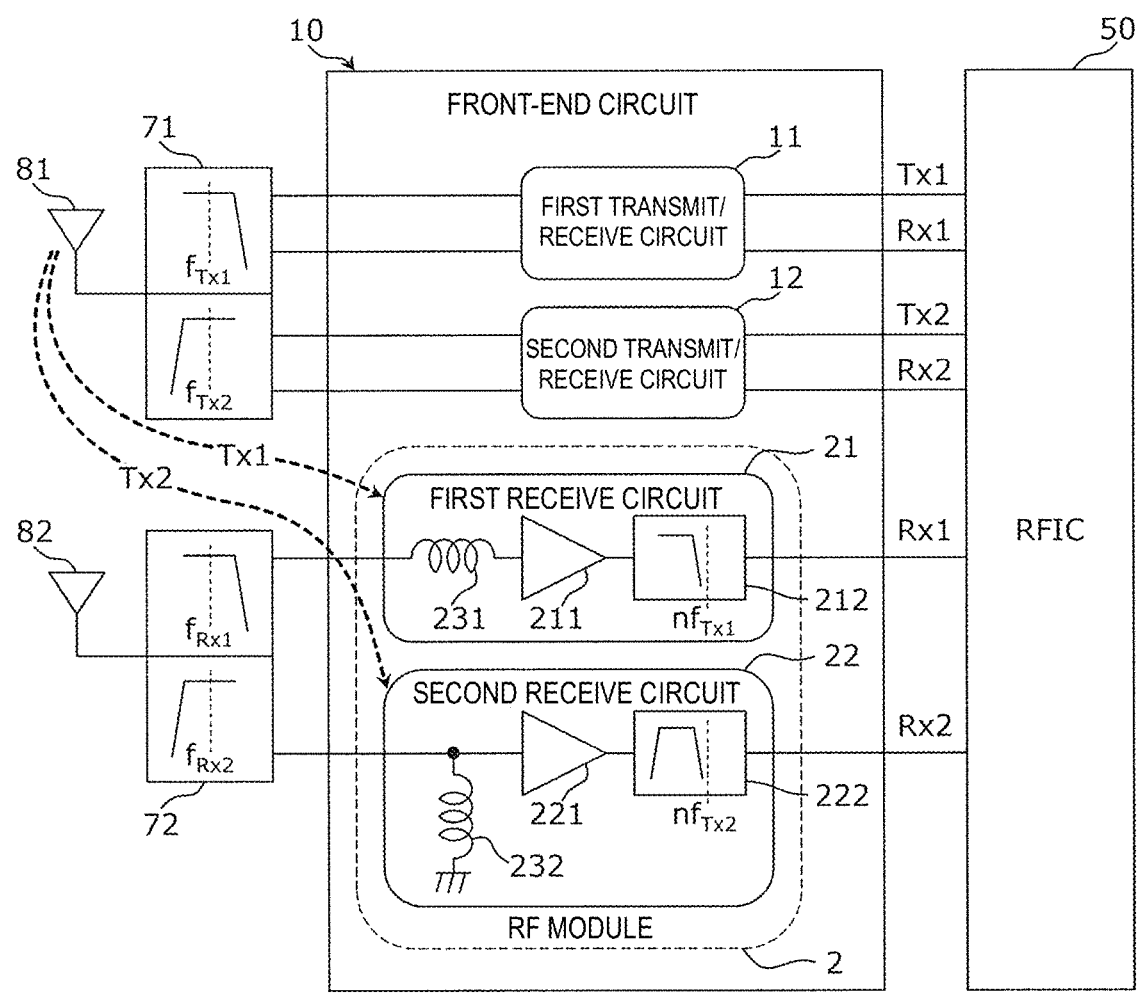
FIG. 1 is a block diagram illustrating an exemplary configuration of a communication device according to a first preferred embodiment of the present invention.

FIG. 1 is a block diagram illustrating a functional example of a communication device according to the first preferred embodiment. FIG. 1 illustrates a principal portion of the communication device including an RFIC (integrated circuit) 50, a front-end circuit 10, diplexers 71 and 72, and antenna terminals (not illustrated) connected to antennas 81 and 82. The front-end circuit 10 includes a first transmit/receive circuit 11, a second transmit/receive circuit 12, a first receive circuit 21, and a second receive circuit 22. The first receive circuit 21 and the second receive circuit 22 are included in an RF module 2.

The first transmit/receive circuit 11 amplifies a transmit signal Tx1 in the first frequency band supplied from the RFIC 50, and supplies the amplified signal to the diplexer 71. The second transmit/receive circuit 12 amplifies a transmit signal Tx2 in the second frequency band supplied from the RFIC 50, and supplies the amplified signal to the diplexer 71. The frequency of the transmit signal Tx1 in the first frequency band is denoted as $f_{Tx1}$. The frequency of the transmit signal Tx2 in the second frequency band is denoted as $f_{Tx2}$.

The diplexer 71 shares the antenna 81 and separates or combines transmit/receive signals in the first frequency band and the second frequency band. The antenna 81 receives and transmits signals.

The antenna 82 receives a signal including a receive signal Rx1 in the first frequency band and a receive signal Rx2 in the second frequency band, and supplies the signal to the diplexer 72. The frequency of the receive signal Rx1 in the first frequency band is denoted as $f_{Rx1}$. The frequency of the receive signal Rx2 in the second frequency band is denoted as $f_{Rx2}$.

The diplexer 72 separates the receive signal Rx1 in the first frequency band and the receive signal Rx2 in the second frequency band from an antenna signal, and supplies the receive signal Rx1 in the first frequency band and the receive signal Rx2 in the second frequency band, which have been separated, to the first receive circuit 21 and the second receive circuit 22, respectively.

The first receive circuit 21 includes a first LNA 211 and a first filter circuit 212. The first receive circuit 21 may further include a first matching device 231. The first receive circuit 21 amplifies the receive signal Rx1 in the first frequency band using the first LNA 211, attenuates frequency component signals, which are not desired and which are included in the amplified receive signal Rx1, using the first filter circuit 212, and supplies the resulting signal to the RFIC 50.

The first matching device 231 defines a first matching circuit to achieve impedance matching at the input end of the first LNA 211. For example, the first matching device 231 is connected between the input end of the first receive circuit 21 and the input end of the first LNA 211. However, the configuration is not limited to this example. The first matching device 231 may be connected between a signal path, which connects the input end of the first receive circuit 21 to the input end of the first LNA 211, and the ground potential. The first matching circuit may include multiple devices including the first matching device 231.

The first filter circuit 212 having attenuation characteristics for spurious components of a transmit signal in the first frequency band is connected to the output end of the first LNA 211, and the first LNA 211 and the first filter circuit 212 are provided in the same package. This causes the first filter circuit 212 to attenuate spurious components of a transmit signal in the first frequency band which are output from the first LNA 211.

The configuration in which the first LNA 211 and the first filter circuit 212 are provided in the same package indicates, for example, that the first LNA 211 and the first filter circuit 212 are mounted on the same surface of a substrate.

The first receive circuit 21 may preferably be structured, for example, in the following manner: the first LNA 211, the first filter circuit 212, and other devices including the first matching device 231 are mounted on a substrate; after the mounted devices and circuits are sealed using a resin, a shielding film is provided on the sealing resin. The advantageous characteristics and effects of the structure of the first receive circuit 21 will be described in detail below.

The second receive circuit 22 includes a second LNA 221 and a second filter circuit 222. The second receive circuit 22 may further include a second matching device 232. The second receive circuit 22 amplifies the receive signal Rx2 in the second frequency band using the second LNA 221, attenuates frequency component signals, which are not desired and which are included in the amplified receive signal Rx2, using the second filter circuit 222, and supplies the resulting signal to the RFIC 50.

The second matching device 232 defines a second matching circuit to achieve impedance matching at the input end of the second LNA 221. For example, the second matching device 232 is connected between a signal path, which connects the input end of the second receive circuit 22 to the input end of the second LNA 221, and the ground potential. However, the configuration is not limited to this example. The second matching device 232 may be connected between the input end of the second receive circuit 22 and the input end of the second LNA 221. The second matching circuit may include multiple devices including the second matching device 232.

The second filter circuit 222 having attenuation characteristics for spurious components of a transmit signal in the second frequency band is connected to the output end of the second LNA 221, and the second LNA 221 and the second filter circuit 222 are provided in the same package. This causes spurious components of a transmit signal in the second frequency band, which are output from the second LNA 221, to be attenuated.

The configuration in which the second LNA 221 and the second filter circuit 222 are provided in the same package indicates, for example, that the second LNA 221 and the second filter circuit 222 are mounted on the same surface of a substrate.

The second receive circuit 22 may be structured, for example, in the following manner: the second LNA 221, the second filter circuit 222, and other devices including the second matching device 232 are mounted on a substrate; after the mounted devices and circuits are sealed using a resin, a shielding film is provided on the sealing resin. The advantageous characteristics and effects of the structure of the second receive circuit 22 will be described in detail below.

The communication device having such a configuration enables simultaneous transmission and reception, such as CA or COEX (Co-Existence), of signals on two or more waves in the first frequency band and the second frequency band.

The RF module 2 uses the first filter circuit 212 having attenuation characteristics for spurious components in the transmit signal Tx1 in the first frequency band. The attenuation characteristics for spurious components of the transmit signal Tx1 in the first frequency band indicate characteristics in which the frequencies $nf_{Tx1}$ (n is a natural number of two or more) of the spurious components lie outside the pass band.

As long as the first filter circuit 212 has attenuation characteristics for spurious components of the transmit signal Tx1, the specific configuration is not limiting. For example, the first filter circuit 212 may connect a resonant circuit between the output end of the first LNA 211 and the ground potential, and may be a notch filter (which includes a low pass filter and a high pass filter having an attenuation pole and which is not illustrated) having an attenuation pole at the frequency of a target spurious component. Hereinafter, a low pass filter is also referred to as an LPF. A high pass filter is also referred to as an HPF. A notch filter pinpoints a target spurious component for attenuation, achieving a reduction or minimization of degradation in insertion loss. The first filter circuit 212 is not limited to a notch filter, and may be a low pass filter (hereinafter also referred to as an LPF), a high pass filter (hereinafter also referred to as an HPF), or a band pass filter (hereinafter also referred to as a BPF).

Due to the attenuation characteristics of the first filter circuit 212, the RF module 2 defines the first receive circuit 21 which reduces or prevents the degradation in receiver sensitivity in simultaneous transmission and reception of signals on two or more waves.

In the RF module 2, the first filter circuit 212 attenuates spurious components. Therefore, a need, for addressing spurious components, to isolate the antenna 81 from the first receive circuit 21 is reduced. As a result, there are a wider range of options, such as the arrangement of components and a wiring pattern.

Spurious components may be attenuated, for example, by reducing the amplification distortion of the first LNA 211. To do this, transistors in the first LNA 211 need to be increased in size, and need to be driven with a large amount of current, resulting in another problem, for example, of an increase in the size of the module and a reduction in the battery life.

Regarding this point, the first filter circuit 212 attenuates spurious components in the RF module 2. Therefore, a state in which the first LNA 211 produces spurious components to a certain degree is allowed. This achieves the first receive circuit 21 which, without an excess increase in the size of the first LNA 211 and an increase in consumption current, is able to reduce or prevent the degradation in receiver sensitivity which is caused by spurious components that are produced by the LNA and that leak from the first receive circuit into the second receive circuit, in simultaneous transmission and reception of signals on two or more waves.

In the RF module 2 in FIG. 1, a configuration similar to that of the first receive circuit 21 is also provided for the second receive circuit 22. Thus, in simultaneous transmission and reception of signals on two or more waves, in the case in which spurious components of the transmit signal Tx2 in the second frequency band and a receive signal in another frequency band are included in the same frequency range, degradation in the receiver sensitivity of a different receive circuit, which is caused by spurious components of the transmit signal Tx2 leaking through wiring and terminals into the different receive circuit receiving a receive signal in a different frequency band, is able to be reduced or prevented.

Examples of signals used in two-wave simultaneous transmission and reception include Band 13 (Tx: about 777 MHz to about 787 MHz) and the GPS, Band 26 (Tx: about 814 MHz to about 849 MHz) and Wi-Fi® 2G, Band 27 (Tx: about 807 MHz to about 824 MHz) and Wi-Fi® 2G, Band 28 (Tx: about 703 MHz to about 748 MHz) and Band 1, Band 3 (Tx: about 1710 MHz to about 1785 MHz) and Band 42, Band 1 (Tx: about 1920 MHz to about 1980 MHz) and Band 43, and Band 7 (Tx: about 2500 MHz to about 2570 MHz) and Wi-Fi® 5G. In addition, two-wave simultaneous transmission and reception in Co-Existence, such as Wi-Fi® and the LTE, are also possible.

In the description above, the case in which a transmit signal leaks from a transmit/receive circuit to a receive circuit is described. However, this is not limiting. For example, in a transmit/receive module including a transmit/receive circuit and a receive circuit, spurious components which occur in an LNA due to a transmit signal leaking into the reception side via a duplexer may leak into a receiver system or receive module in a different transmit/receive module, resulting in degradation in receiver sensitivity. When the receive circuit of the transmit/receive module has the configuration described above, the degradation in receiver sensitivity is able to be reduced or prevented.

The RF module 2 is not limited to the example in FIG. 1. An RF module including a receive circuit using a filter circuit whose frequency characteristics are variable will be described below.

Figure 2:
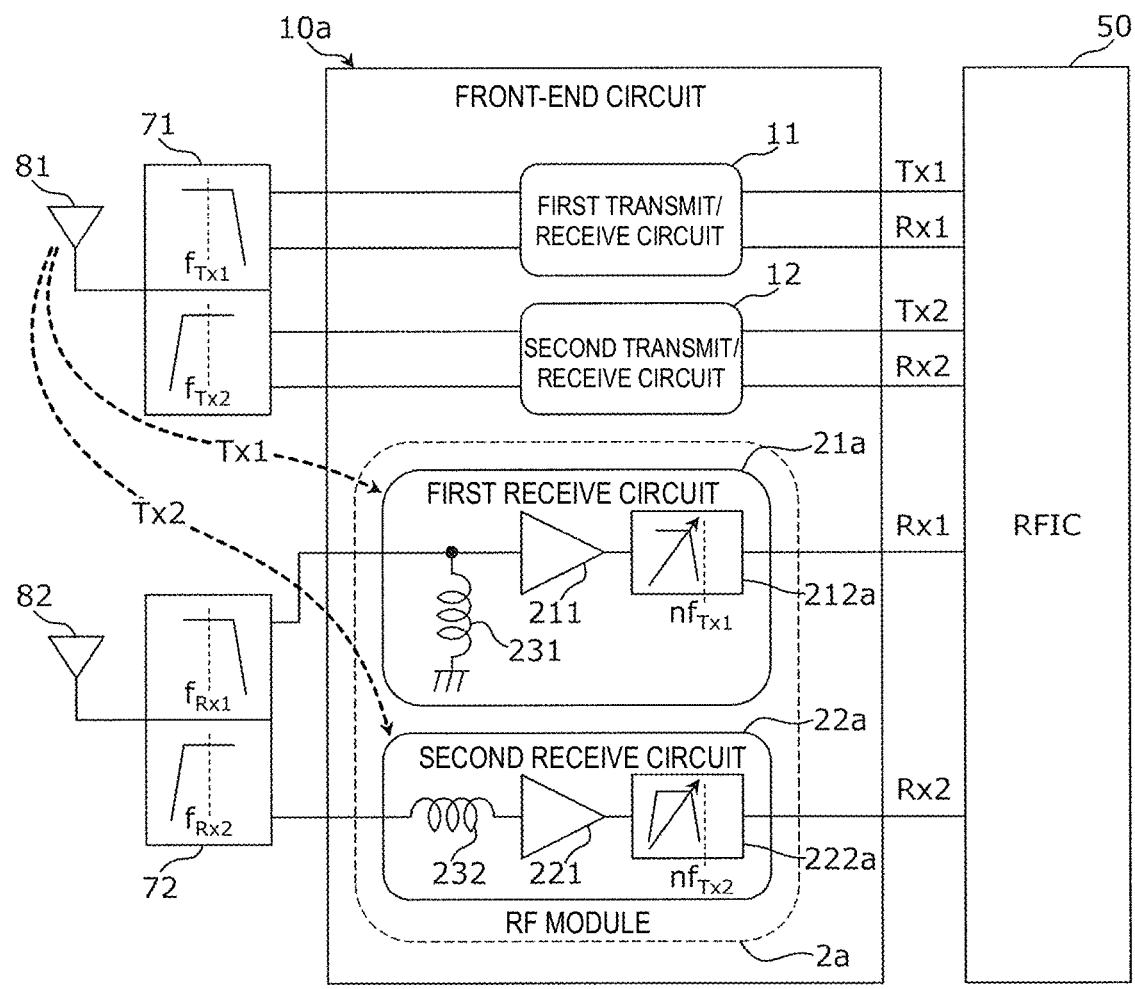
FIG. 2 is a block diagram illustrating an exemplary configuration of a communication device according to a modified example of the first preferred embodiment of the present invention.

FIG. 2 is a block diagram illustrating a functional example of a communication device according to a modified example of the first preferred embodiment. A front-end circuit 10a illustrated in FIG. 2 is different from the front-end circuit 10 in FIG. 1 in that, in an RF module 2a, a first receive circuit 21a includes a first filter circuit 212a and a second receive circuit 22a includes a second filter circuit 222a.

The first filter circuit 212a and the second filter circuit 222a are each a filter circuit including a variable device (for example, a variable capacitance or a variable inductor) which is capable of adjusting the attenuating frequency.

For example, use of the first filter circuit 212a and the second filter circuit 222a enables each of the first receive circuit 21a and the second receive circuit 22a to easily adjust the attenuating frequency to the frequency for target spurious components, for example, when a receive signal in a target frequency band selected from multiple frequency bands is received.

The attenuating frequencies for the first filter circuit 212a and the second filter circuit 222a are adjusted using variable capacitors. Thus, for example, compared with a filter circuit having a wide attenuation band which enables multiple spurious components in different frequency bands to be attenuated at one time, the insertion loss may be reduced. Compared with a circuit that switches by using a switch, among multiple filter devices (for example, SAW filters) whose attenuating frequencies are fixed to spurious components in the respective frequency bands, the circuit size is able to be reduced.

For example, the first filter circuit 212a may preferably be a variable notch filter (including an LPF and an HPF having an attenuation pole and not being illustrated) which connects a resonant circuit, including a variable capacitor, between the output end of the first LNA 211 and the ground potential and which is able to move the attenuation pole to the frequency of a target spurious component. The second filter circuit 222a may also preferably be a variable notch filter configured similarly, for example. A variable notch filter pinpoints a target spurious component for attenuation. Therefore, the degradation in insertion loss and NF (noise factor) is able to be reduced or minimized.

In addition to selection of a target spurious component from multiple spurious components in different frequency bands, for example, the first filter circuit 212a and the second filter circuit 222a are able to perform fine adjustment of their attenuating frequencies, such as compensation of characteristics variation for each receive circuit. Thus, attenuation characteristics of multiple receive circuits are able to be easily harmonized even after completion of the receive circuits.

Second Preferred Embodiment

In a second preferred embodiment of the present invention, the packaging structure of the RF module 2 described above will be described by taking, as an example, the configuration of the first receive circuit 21.

Figure 3A:
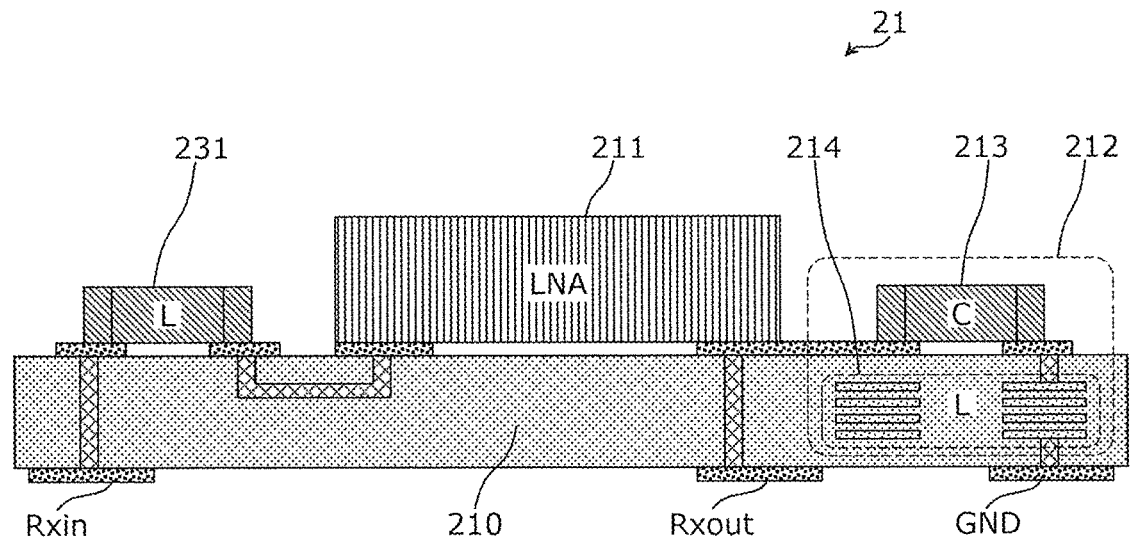
FIG. 3A is a side view illustrating an exemplary configuration of a first receive circuit according to a second preferred embodiment of the present invention.

FIG. 3A is a side view illustrating an exemplary configuration of the first receive circuit 21. In the example in FIG. 3A, the first receive circuit 21 has a configuration in which the first LNA 211, the first filter circuit 212, and the matching device 231 are disposed on the same surface of the same substrate 210.

The first LNA 211 is preferably, for example, a surface-mount chip transistor, and is connected to a first principal surface of the first substrate 210 using a conductive jointing material, such as solder, for example.

The first filter circuit 212 has a configuration in which an LC resonant circuit, in which a capacitor device 213 and an inductor 214 are connected to each other in series, is connected between the output end of the first LNA 211 and the ground potential. The capacitor device 213 is preferably, for example, a surface-mount chip capacitor, and is connected to the first principal surface of the substrate 210 using a conductive jointing material such as solder, for example. The inductor 214 is preferably a substrate-embedded inductor, for example, and is defined by a conductive pattern disposed in the inside layer of the substrate 210.

The matching device 231 is preferably a surface-mount chip inductor, for example, and is connected to the first principal surface of the substrate 210 using a conductive jointing material such as solder, for example.

In the first receive circuit 21, the first LNA 211 and the first filter circuit 212 are disposed on the same surface of the same substrate 210. Therefore, the connection wiring between the first LNA 211 and the first filter circuit 212 is reduced, thus achieving a reduction in insertion loss of the first filter circuit 212.

At least a portion of the first filter circuit 212 (in the example in FIG. 3A, the inductor 214) is provided inside the substrate 210. Thus, isolation is ensured between a device (for example, the matching device 231) disposed upstream of the first LNA and the first filter circuit 212, thus achieving a reduction or prevention of the occurrence of failures, such as degradation in attenuation characteristics and oscillation, due to insufficient isolation.

The second receive circuit 22 is structured similarly to the first receive circuit 21 in FIG. 3A (not illustrated). The first receive circuit 21a and the second receive circuit 22a are provided by changing the capacitor device 213 of the first receive circuit 21 in FIG. 3A to a variable capacitor (which may include a control IC and a driver to change capacitance).

That is, in the second receive circuit 22, the second LNA 221, the second filter circuit 222, and the second matching device 232 are disposed on the same principal surface of the same substrate, or at least a portion of the second filter circuit 222 is provided inside the substrate. Thus, advantageous effects of a decrease in insertion loss and a reduction or prevention of the occurrence of failures, such as degradation in attenuation characteristics and oscillation, are able to be obtained.

In the first receive circuit 21a, the first LNA 211, the first filter circuit 212a, and the first matching device 231 are disposed on the same principal surface of the same substrate, or at least a portion of the first filter circuit 212a is provided inside the substrate, thus achieving advantageous effects of a decrease in insertion loss and a reduction or prevention of the occurrence of failures, such as degradation in attenuation characteristics and oscillation.

In the second receive circuit 22a, the second LNA 221, the second filter circuit 222a, and the second matching device 232 are disposed on the same principal surface of the same substrate, or at least a portion of the second filter circuit 222a is provided inside the substrate, thus achieving advantageous effects of a decrease in insertion loss and a reduction or prevention of the occurrence of failures, such as degradation in attenuation characteristics and oscillation.

In the RF module 2, the first receive circuit 21 and the second receive circuit 22 are provided on corresponding different substrates to provide isolation. Thus, the amount of spurious components leaking from the first receive circuit 21 into the second receive circuit 22 is able be reduced, and the amount of spurious components leaking from the second receive circuit 22 into the first receive circuit 21 is also able to be reduced.

Figure 3B:
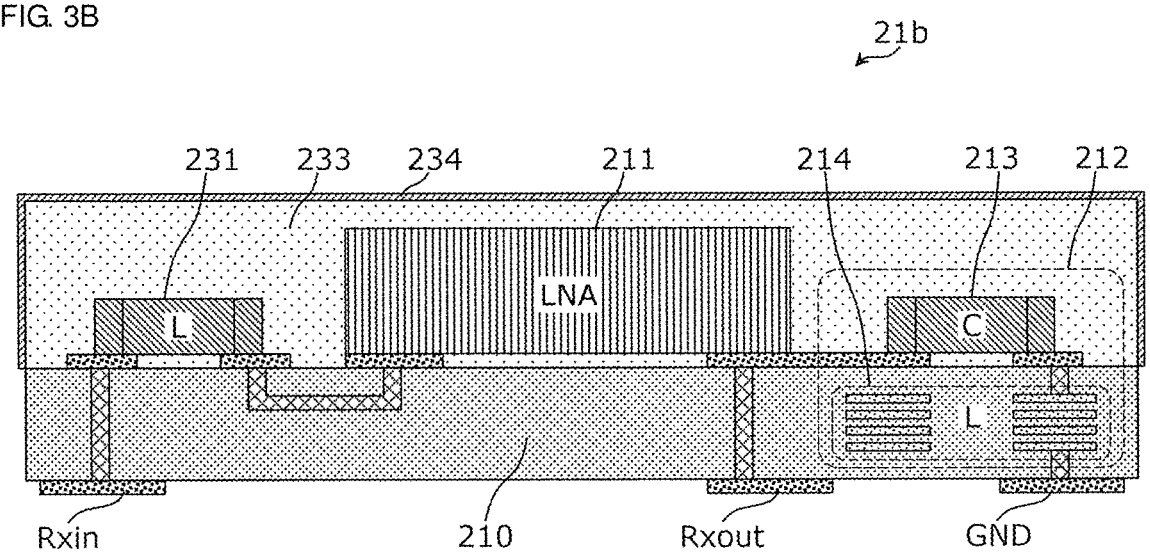
FIG. 3B is a side view illustrating an exemplary configuration of a first receive circuit according to the second preferred embodiment of the present invention.

FIG. 3B is a side view illustrating an exemplary configuration of a first receive circuit 21b. In the example in FIG. 3B, the first LNA 211, the capacitor device 213, and the matching device 231 are sealed using a resin 233. A conductive shielding film 234 is provided on the surfaces of the resin 233.

A shielding film is provided on a resin sealing the substrate on which the first receive circuit 21 is provided, and a shielding film is provided on a resin sealing the substrate on which the second receive circuit 22 is provided, thus ensuring improved isolation. Such an advantageous effect is also obtained similarly in the RF module 2a.

A configuration in which the first receive circuit 21 and the second receive circuit 22 are provided on different substrates is described. However, this example is not limiting.

Figure 3C:
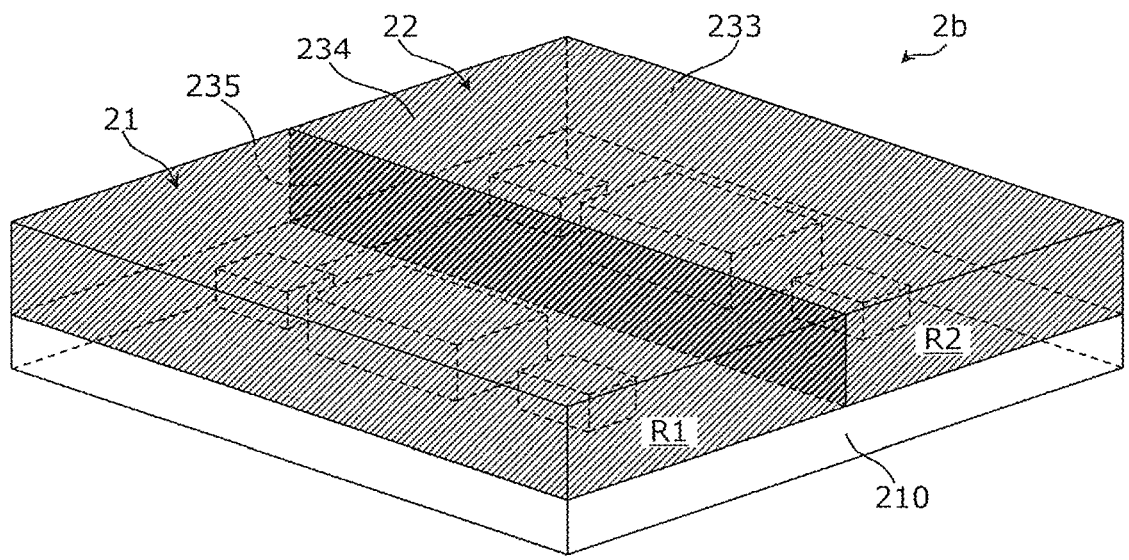
FIG. 3C is a perspective view illustrating an exemplary configuration of an RF module according to the second preferred embodiment of the present invention.

FIG. 3C is a perspective view illustrating an exemplary packaging structure of an RF module 2b in which the first receive circuit 21 and the second receive circuit 22 are provided on the same principal surface of the same substrate.

In the RF module 2b, when the substrate 210 is viewed in plan, the first receive circuit 21 and the second receive circuit are provided in a first area R1 and a second area R2, respectively. The shielding film 234 is provided on the surfaces of the resin 233 sealing the first receive circuit 21 and the second receive circuit 22. A shield wall 235 is provided inside the resin 233. The shield wall 235 may preferably be provided, for example, by providing a groove in the resin 233 between the first area R1 and the second area R2 and filling the groove with a conductive paste whose main component is copper (Cu), silver (Ag), or other suitable material. The shield wall 235 connects with the shielding film 234.

Thus, while the first receive circuit 21 and the second receive circuit 22 are provided on the same principal surface of the same substrate, the RF module 2 in which isolation between the first receive circuit 21 and the second receive circuit 22 is ensured is able to be obtained.

Third Preferred Embodiment

In a third preferred embodiment of the present invention, a specific exemplary configuration of a filter circuit will be described.

Figure 4:
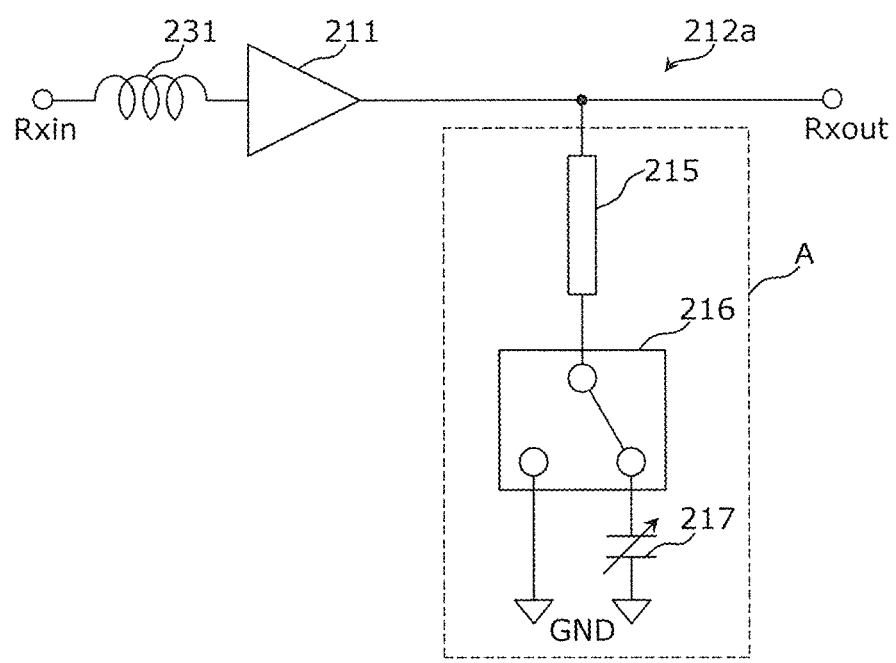
FIG. 4 is a circuit diagram illustrating an exemplary filter circuit according to a third preferred embodiment of the present invention.

FIG. 4 is a circuit diagram illustrating an exemplary filter circuit according to the third preferred embodiment. FIG. 4 illustrates, as well as the first LNA 211, a specific exemplary configuration of the first filter circuit 212a which corresponds to the first receive circuit 21a in FIG. 2. The first filter circuit 212a in FIG. 4 includes a transmission line 215, a switch 216, and a variable capacitor 217.

The transmission line 215 has short circuit characteristics for even-order spurious components of the transmit signal Tx1 in the first frequency band. A first end of the transmission line 215 is connected to the output end of the first LNA 211. A second end of the transmission line 215 is connected via the variable capacitor 217 or directly to the ground potential in accordance with the state of the switch 216. That is, the first filter circuit 212a may include the transmission line 215 which is connected between the output end of the LNA 211 and the ground potential, and which has short circuit characteristics for spurious components of the transmit signal Tx1 in the first frequency band.

That is, the first filter circuit 212a includes a short stub A having the ground potential GND and the transmission line 215 which is connected between the output end of the first LNA 211 and the ground potential GND and which has short circuit characteristics for even-order spurious components of the transmit signal Tx1 in the first frequency band.

In the example in FIG. 4, the short stub A including the transmission line 215 is provided for spurious components which are output from the first LNA 211. Therefore, the first filter circuit 212a, which has an attenuation pole at the frequency of a spurious component and whose insertion loss is small, includes a small number of components.

Figure 5:
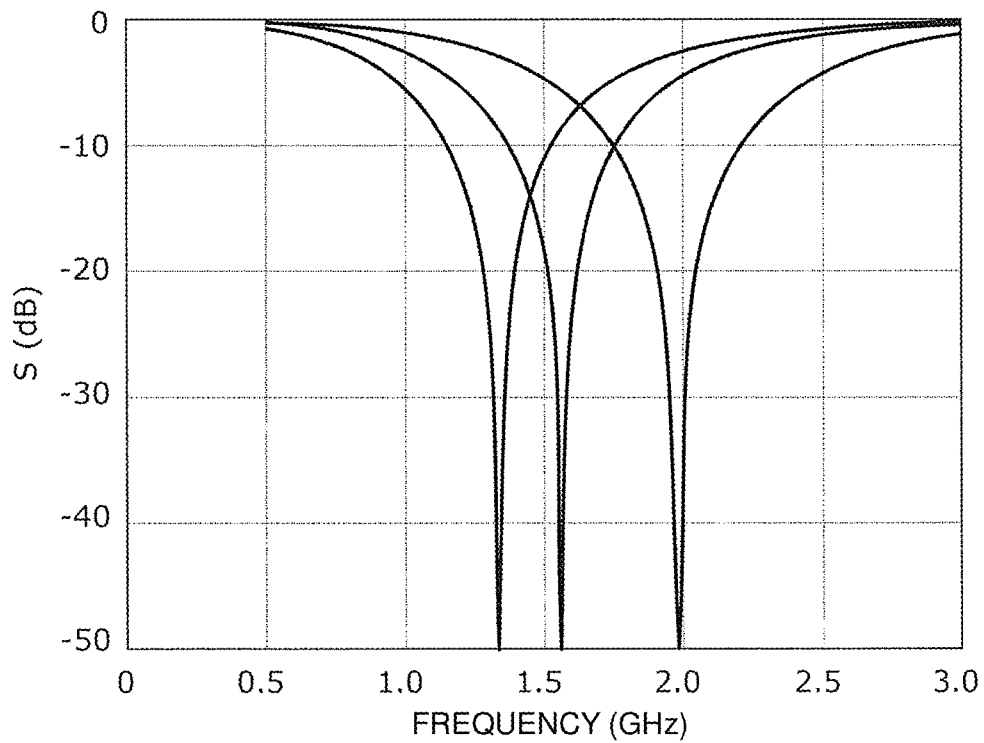
FIG. 5 is a graph illustrating exemplary attenuation characteristics of a filter circuit according to the third preferred embodiment of the present invention.

FIG. 5 is a graph illustrating exemplary attenuation characteristics of the first filter circuit 212a. In the first filter circuit 212a, connecting the transmission line 215 directly to the ground potential and changing the capacitance of the variable capacitor 217 is able to make the attenuation pole variable as illustrated in FIG. 5.

A specific configuration of a filter circuit is not limited to the example in FIG. 4. Another specific exemplary configuration of a filter circuit will be described below.

Figure 6:
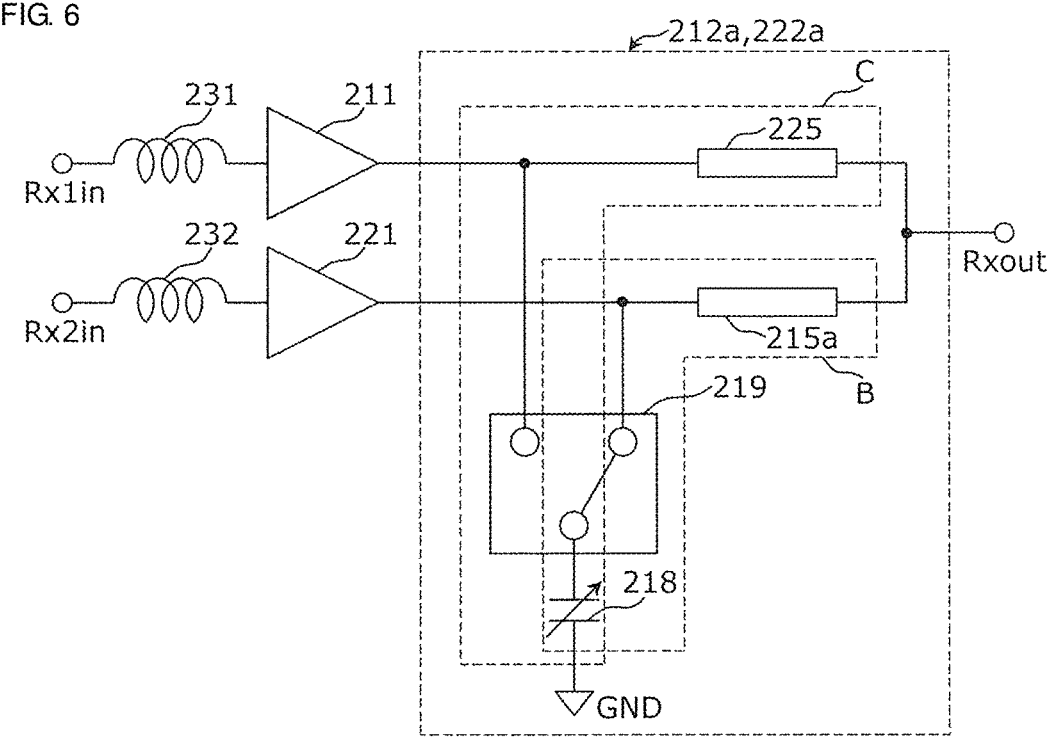
FIG. 6 is a circuit diagram illustrating another exemplary filter circuit according to the third preferred embodiment of the present invention.

FIG. 6 is a circuit diagram illustrating another example of a filter circuit according to the third preferred embodiment. FIG. 6 illustrates, as well as the first LNA 211 and the second LNA 221, an example of the first filter circuit 212a and the second filter circuit 222a which correspond to a circuit obtained by integrating the first receive circuit 21a and the second receive circuit 22a in FIG. 2 such that a shared output end is provided. The first filter circuit 212a and the second filter circuit 222a in FIG. 6 include a first transmission line 225, a second transmission line 215a, a variable capacitor 218, and a switch 219.

A first end of the first transmission line 225 is connected to the output end of the first LNA 211.

A first end of the second transmission line 215a is connected to the output end of the second LNA 221.

A first end of the variable capacitor 218 is connected to the ground potential GND.

The switch 219 connects a second end of the variable capacitor 218 selectively to one of the output end of the first LNA 211 and the output end of the second LNA 221.

A second end of the first transmission line 225 is connected to a second end of the second transmission line 215a.

In this configuration, in the first state in which the second end of the variable capacitor 218 is connected to the output end of the second LNA 221, the ground potential GND, the variable capacitor 218, and the second transmission line 215a are electrically connected to each other. Thus, the first filter circuit 212a, which includes a short stub B having short circuit characteristics for even-order spurious components (hereinafter referred to as first spurious components) of the transmit signal Tx1 in the first frequency band, is provided.

In the first state, the first filter circuit 212a attenuates the first spurious components which are output from the first LNA 211, and the first spurious components, which occur at the connection point between the second end of the second transmission line 215a and the second end of the first transmission line 225, are attenuated.

In the second state in which the second end of the variable capacitor 218 is connected to the output end of the first LNA 211, the ground potential GND, the variable capacitor 218, and the first transmission line 225 are electrically connected to each other. Thus, the second filter circuit 222a, which includes a stub C having short circuit characteristics for even-order spurious component (hereinafter referred to as second spurious components) of the transmit signal Tx2 in the second frequency band, is provided.

In the second state, the second filter circuit 222a attenuates the second spurious components which are output from the second LNA 221, and the second spurious components, which occur at the connection point between the second end of the second transmission line 215a and the second end of the first transmission line 225, are attenuated.

Thus, in accordance with the state of the switch 219, the second transmission line 215a, the first transmission line 225, and the variable capacitor 218 define one of the first filter circuits 212a and 222a. This causes a filter circuit, which is able to attenuate the first spurious components or the second spurious components selectively in accordance with the state of the switch 219, to be provided with the minimum number of components of the second transmission line 215a, the first transmission line 225, and the shared variable capacitor 218.

Fourth Preferred Embodiment

In a fourth preferred embodiment of the present invention, a communication device including a front-end circuit including an RF module according to the first preferred embodiment and its modified example will be described.

Figure 7:
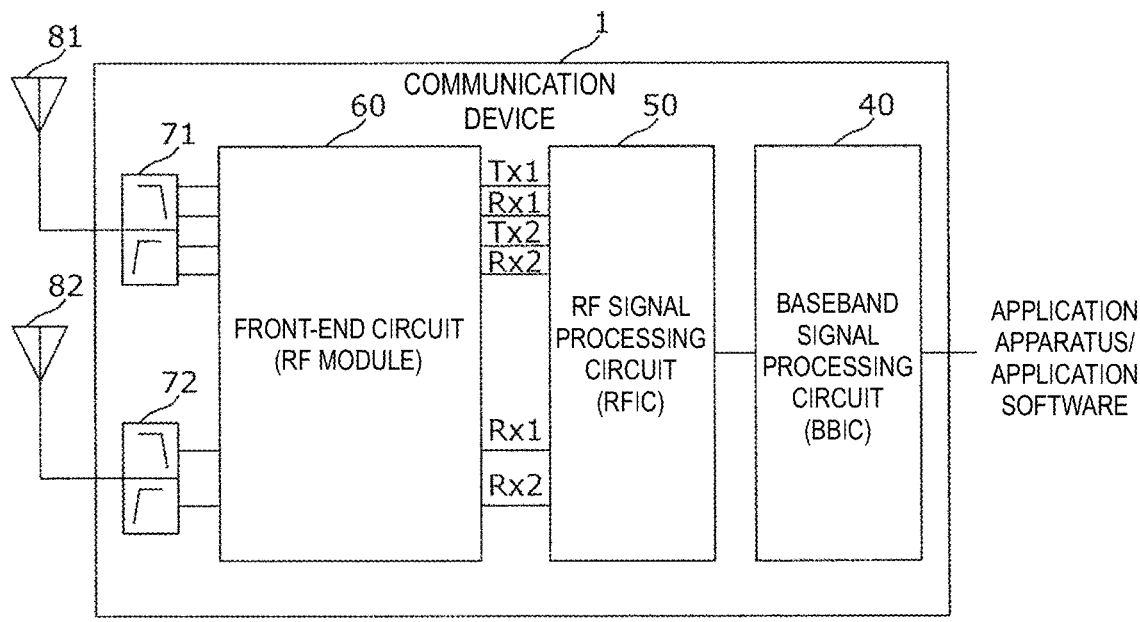
FIG. 7 is a block diagram illustrating an exemplary functional configuration of a communication device according to a fourth preferred embodiment of the present invention.
Figure 8:
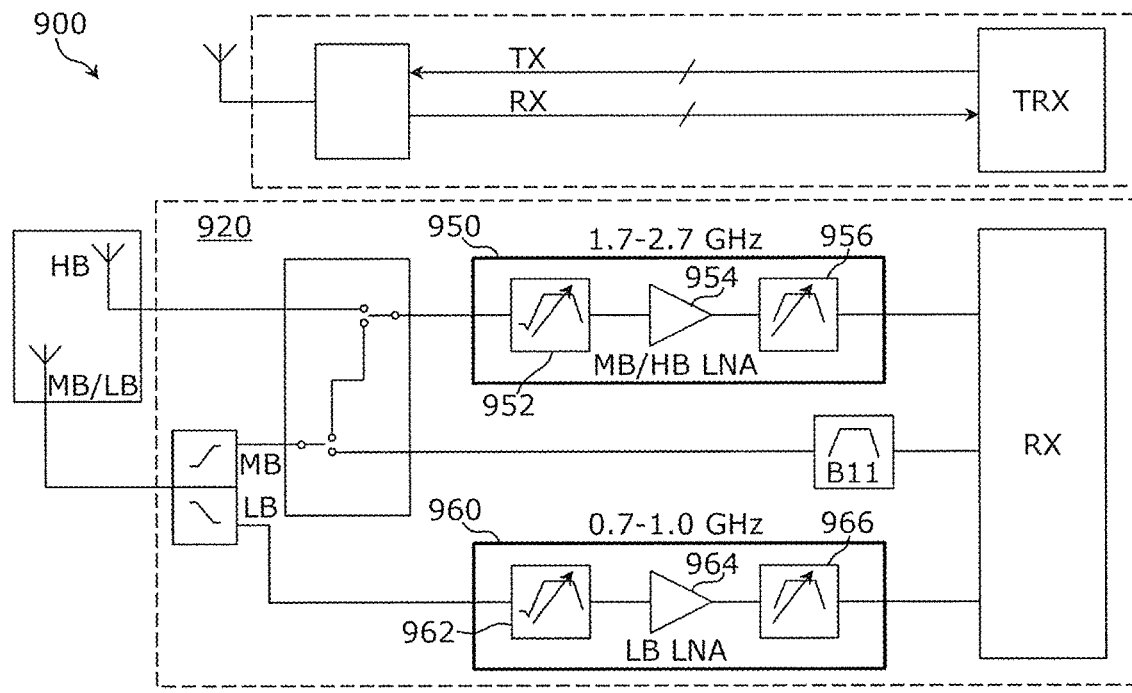
FIG. 8 is a block diagram illustrating an exemplary configuration of a system having a tunable RF module of the related art.

FIG. 7 is a block diagram illustrating an exemplary functional configuration of a communication device 1 according to the fourth preferred embodiment. As illustrated in FIG. 7, the communication device 1 includes a baseband signal processing circuit 40, the RF signal processing circuit 50, a front-end circuit 60, the diplexers 71 and 72, and the antennas 81 and 82. In the front-end circuit 60, the front-end circuit 10 or 10a including an RF module described in the first preferred embodiment and its modified example is provided.

The baseband signal processing circuit 40 converts, into a transmit signal, transmit data generated by an application apparatus/application software which performs, for example, a voice call and image display. The baseband signal processing circuit 40 supplies the resulting signal to the RF signal processing circuit 50. The conversion may include data compression, multiplexing, and addition of error correcting codes. A receive signal received from the RF signal processing circuit 50 is converted to receive data which is supplied to an application apparatus/application software. The conversion may include expansion of data, demultiplexing, and error correction. The baseband signal processing circuit 40 may preferably be, for example, a baseband integrated circuit (BBIC) chip.

The RF signal processing circuit 50 converts, to a transmit RF signal, a transmit signal generated by the baseband signal processing circuit 40, and supplies the resulting signal to the front-end circuit 60. The conversion may include modulation and upconverting of a signal. The RF signal processing circuit 50 converts, to a receive signal, a receive RF signal received from the front-end circuit 60, and supplies the resulting signal to the baseband signal processing circuit 40. The conversion may include demodulation and downconverting of a signal. The RF signal processing circuit 50 may be a radio-frequency integrated circuit (RFIC) chip.

To perform simultaneous transmission and reception of signals on two or more waves, the RF signal processing circuit 50 concurrently generates the transmit signals Tx1 and Tx2 in different frequency bands, and concurrently receives the receive signals Rx1 and Rx2 in different frequency bands from the front-end circuit 60.

The front-end circuit 60 amplifies, using power amplifiers, the transmit signals Tx1 and Tx2 in the respective frequency bands which are generated by the RF signal processing circuit 50. The diplexer 71 combines the transmit RF signals Tx1 and Tx2 in the respective frequency bands, and transmits the resulting signal by using the antenna 81.

The diplexer 72 separates the receive signals Rx1 and Rx2 in the respective frequency bands from a signal received using the antenna 82. The front-end circuit 60 amplifies, using LNAs, the separated receive signals Rx1 and Rx2 in the respective frequency bands, attenuates spurious components of the transmit signals Tx1 and Tx2, and supplies the resulting signals to the RF signal processing circuit 50.

The communication device 1 includes the front-end circuit 60 or a front-end circuit 60a including an RF module which effectively reduces or prevents spurious components that cause the degradation in receiver sensitivity in simultaneous transmission and reception of signals on two or more waves. Thus, a communication device having excellent receiver sensitivity in simultaneous transmission and reception of signals on two or more waves is able to be obtained.

The RF modules and the communication devices according to the preferred embodiments of the present invention have been described above. The present invention is not limited to the individual preferred embodiments described above. The scope of the present invention may include a preferred embodiment obtained by performing various changes, which are achieved by those skilled in the art, on the present preferred embodiments, and a preferred embodiment provided by combining components in different preferred embodiments together as long as they do not depart from the gist of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A radio frequency module for receiving/transmitting a plurality of signals simultaneously, the plurality of signals including at least a receive signal in a first frequency band and a receive signal in a second frequency band, the radio frequency module comprising:
a first receive circuit that processes the receive signal in the first frequency band;
wherein
the first receive circuit includes:
a first substrate;
a first low noise amplifier mounted on a principal surface of the first substrate; and
a first filter circuit connected to an output end of the first low noise amplifier and including at least a first portion provided on the principal surface of the first substrate; and
the first filter circuit attenuates spurious components generated by a transmit signal in the first frequency band received by the first low noise amplifier and output from the first low noise amplifier, the spurious components being included in the transmit signal in the first frequency band and having a frequency bandwidth that overlaps, includes, or is included in a frequency bandwidth of the receive signal in the second frequency band.

2. The radio frequency module according to claim 1, wherein the first filter circuit includes a variable capacitor, and has a variable attenuating frequency.

3. The radio frequency module according to claim 1, wherein a second portion, other than the first portion, of the first filter circuit is provided inside the first substrate.

4. The radio frequency module according to claim 1, wherein
the first filter circuit is connected between the output end of the first low noise amplifier and a ground potential, and includes a short stub including a transmission line; and
the transmission line has short circuit characteristics for even-order spurious components of the transmit signal in the first frequency band.

5. The radio frequency module according to claim 1, further comprising:
a second receive circuit that processes the receive signal in the second frequency band;
wherein
the second receive circuit includes:
a second low noise amplifier; and
a second filter circuit connected to an output end of the second low noise amplifier, and having attenuation characteristics for spurious components of a transmit signal in the second frequency band.

6. The radio frequency module according to claim 5, further comprising:
a first transmission line including a first end connected to the output end of the first low noise amplifier;
a second transmission line including a first end connected to the output end of the second low noise amplifier;
a variable capacitor including a first end connected to a ground potential; and
a switch connecting a second end of the variable capacitor selectively to the output end of the first low noise amplifier or the output end of the second low noise amplifier; wherein
a second end of the first transmission line is connected to a second end of the second transmission line;
the first transmission line, the second transmission line, and the variable capacitor define
(i) the first filter circuit having short circuit characteristics for even-order spurious components of the transmit signal in the first frequency band by electrically connecting the ground potential, the variable capacitor, and the second transmission line to each other in a first state in which the second end of the variable capacitor is connected to the output end of the second low noise amplifier; and
(ii) the second filter circuit having short circuit characteristics for even-order spurious components of the transmit signal in the second frequency band by electrically connecting the ground potential, the variable capacitor, and the first transmission line to each other in a second state in which the second end of the variable capacitor is connected to the output end of the first low noise amplifier.

7. The radio frequency module according to claim 1, wherein the first low noise amplifier is a surface-mount chip transistor.

8. The radio frequency module according to claim 1, wherein the first filter circuit includes a capacitor mounted on the principal surface of the first substrate and an inductor disposed in the first substrate.

9. The radio frequency module according to claim 1, wherein the low noise amplifier is sealed by a resin.

10. The radio frequency module according to claim 9, wherein a conductive shielding film is provided on surfaces of the resin.

11. A communication device comprising:
the radio frequency module according to claim 1; and
an RF signal processing circuit that receives a radio-frequency receive signal from the radio frequency module.

12. The communication device according to claim 11, wherein the first filter circuit includes a variable capacitor, and has a variable attenuating frequency.

13. The communication device according to claim 11, wherein a second portion, other than the first portion, of the first filter circuit is provided inside the first substrate.

14. The communication device according to claim 11, wherein
the first filter circuit is connected between the output end of the first low noise amplifier and a ground potential, and includes a short stub including a transmission line; and
the transmission line has short circuit characteristics for even-order spurious components of the transmit signal in the first frequency band.

15. The communication device according to claim 11, further comprising:
a second receive circuit that processes the receive signal in the second frequency band;
wherein
the second receive circuit includes:
a second low noise amplifier; and
a second filter circuit connected to an output end of the second low noise amplifier, and having attenuation characteristics for spurious components of a transmit signal in the second frequency band.

16. The communication device according to claim 15, further comprising:
a first transmission line including a first end connected to the output end of the first low noise amplifier;
a second transmission line including a first end connected to the output end of the second low noise amplifier;
a variable capacitor including a first end connected to a ground potential; and
a switch connecting a second end of the variable capacitor selectively to the output end of the first low noise amplifier or the output end of the second low noise amplifier; wherein
a second end of the first transmission line is connected to a second end of the second transmission line;
the first transmission line, the second transmission line, and the variable capacitor define
(i) the first filter circuit having short circuit characteristics for even-order spurious components of the transmit signal in the first frequency band by electrically connecting the ground potential, the variable capacitor, and the second transmission line to each other in a first state in which the second end of the variable capacitor is connected to the output end of the second low noise amplifier; and
(ii) the second filter circuit having short circuit characteristics for even-order spurious components of the transmit signal in the second frequency band by electrically connecting the ground potential, the variable capacitor, and the first transmission line to each other in a second state in which the second end of the variable capacitor is connected to the output end of the first low noise amplifier.

17. The communication device according to claim 11, wherein the first low noise amplifier is a surface-mount chip transistor.

18. The communication device according to claim 11, wherein the first filter circuit includes a capacitor mounted on the principal surface of the first substrate and an inductor disposed in the first substrate.

19. The communication device according to claim 11, wherein the low noise amplifier is sealed by a resin.

20. The communication device according to claim 19, wherein a conductive shielding film is provided on surfaces of the resin.

* * * * *